United States Patent Office 3,494,941
Patented Feb. 10, 1970

---

3,494,941
NITRATE ESTERS OF 17β-(HYDROXYALKOXY)
STEROID 3-OLS, 3-ONES AND 3-AMIDINOHY-
DRAZONES
Kurt W. Ledig, Philadelphia, and Gerhard R. Wendt,
Havertown, Pa., assignors to American Home Products
Corporation, New York, N.Y., a corporation of Delaware
No Drawing. Filed Dec. 4, 1967, Ser. No. 687,451
Int. Cl. C07c *169/10, 167/28;* A61k *17/00*
U.S. Cl. 260—397.4                        4 Claims

ABSTRACT OF THE DISCLOSURE

Nitrate esters of 17β-(hydroxyalkoxy)steroidal 3-ols, 3-ones and 3-amidinohydrazones and salts of the latter (I) are prepared by nitrating the corresponding 17β-(hydroxyalkoxy) steroidal 3-ols or 3-ones and, where required, treating the 3-ones with an aminoguanidine, or a salt thereof, then the resulting product, if a base, with an organic or inorganic acid. Compounds of Formula I are pharmacologically active, especially as cardiovascular agents, particularly vasodilators.

---

This invention relates to steroidal nitrate esters with valuable pharmacological properties. More particularly, it is concerned with novel nitrate esters of 17β-(hydroxyalkoxy)steroid 3-ols, 3-ones and amidinohydrazones and their salts, which are cardiovascular agents, useful in the treatment of heart conditions, and as vasodilators.

DESCRIPTION OF THE INVENTION

The compounds of this invention are selected from the group consisting of those of Formula I:

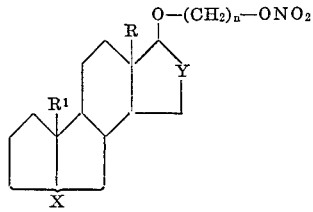

wherein
$n$ is 2 or 3;
R is lower alkyl;
$R^1$ is hydrogen, methyl or ethyl;
Y is

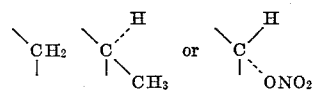

and X is

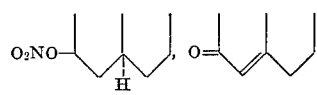

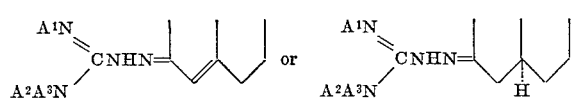

wherein $A^1$ and $A^2$, independently, are hydrogen or (lower)alkyl or, taken together, are —CH$_2$CH$_2$—; and $A^3$ is hydrogen, nitro, (lower)alkyl, di(lower)alkylamino(lower)alkyl, hexamethyleneimino(lower)alkyl, heptamethyleneimino(lower)alkyl or octamethyleneimino(lower)alkyl, provided however that when $A^1$ and $A^2$ taken together are —CH$_2$CH$_2$—, $A^3$ is hydrogen; and pharmaceutically-acceptable acid addition salts of said compounds wherein X is basically-substituted with the amidinohydrazone group.

Special mention is made of three particularly valuable embodiments of the instant invention. These are:

d-17β-(2-hydroxyethoxy)-5α-estran-3-β-ol, dinitrate, a compound of Formula I wherein $n$ is 2, R is CH$_3$, $R^1$ is hydrogen, Y is

and X is

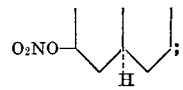

d-17β-(2-hydroxyethoxy)estra-4-en-3-one, nitrate, a compound of Formula I wherein $n$ is 2, R is CH$_3$, $R^1$ is hydrogen, Y is

and X is

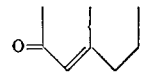

and
d-17β-(2-hydroxyethoxy)-ester-4-en-3-one, amidinohydrazone, nitrate ester, a compound of Formula I wherein $n$ is 2, R is CH$_3$, $R^1$ is hydrogen,
Y is

and X is

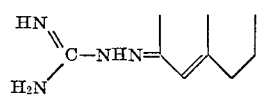

especially when in the form of an acid addition salt with nitric acid.

When used herein and in the appended claims, the term "lower alkyl" contemplates saturated hydrocarbon radicals, straight and branched chain, having from about 1 to about 6 carbon atoms. Illustrative lower alkyl radicals therefore are methyl, ethyl, n-propyl, i-propyl, n-butyl, t-butyl, n-pentyl, n-hexyl, 2-methylpentyl, and the like. Since, as will be apparent to those skilled in the art, the amidinohydrazone compounds within the scope of Formula I are basic in nature, they react with organic and inorganic acids in methods well known to form pharmaceutically-acceptable acid addition salts. These salts with, for example, fumaric acid, malic acid, citric acid, tartaric acid, embonic acid, acetic acid, hydrochloric acid, sulfuric acid, and the like, comprise useful embodiments of the instant invention, especially where dosage forms of enhanced solubility, crystallinity, etc., are desired.

The compounds of Formula I can be obtained in a number of ways. One especially convenient method comprises:

(a) Esterifying with fuming nitric acid at a temperature of from about +5° C. to about −65° C. a 5-α-gonane of Formula IIa:

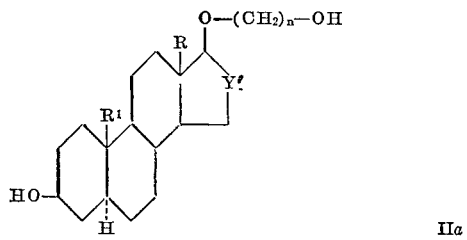

wherein n, R and R¹ are as defined and Y' is Y as hereinabove defined or

(b) Esterifying with fuming nitric acid at a temperature of from about +5° C. to about −65° C. a gon-4-en-3-one of Formula IIb:

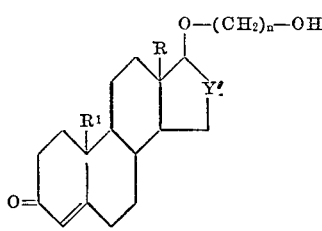

wherein n, R, R¹ and Y' are as above defined; or (c) Condensing the nitrate ester of the gon-4-en-3-one prepared in Step (b) with an aminoguanidine acid-addition salt to form the correspondingly-substituted 3-amidinohydrazone salt.

The esterification conditions for Steps (a) and (b), above, are not particularly critical. It is useful to use fuming nitric acid in admixture with acetic anhydride. An especially convenient technique comprises cooling a mixture of 4.7 parts by volume of acetic anhydride and 1.6 parts by volume of nitric acid (fuming 90%) to about −40° C. and adding to the mixture about 0.7 part by weight of the steroid of Formula IIa or IIb. The reaction mixture is brought then to about 0° C. within about 5 minutes, and the formation of the nitrate ester is substantially complete. The products from Steps (a) and (b) can be recovered in any conventional manner. One especially useful means is to pour the reaction mixture into ice-water, neutralize with a base such as alkali metal bicarbonate, and extract the mixture with an organic solvent, such as ether. Evaporation of the ether to dryness leaves the product as a residue. Alternatively, the ether can be concentrated, then the addition of a less polar solvent, such as hexane, will cause the desired product to precipitate.

The condensation conditions for Step (c) are not particularly critical. The nitrate ester of the gon-4-en-3-one (IIb) is treated with a salt of an amidino compound of the formula:

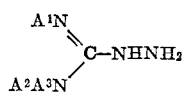

wherein A¹, A² and A³ are as hereinabove defined. The aminoguanidines used in the preparation of the compounds of this invention are known compounds either available commercially or prepared by processes well known to those skilled in the art. For example, the 1-(lower)alkyl - 3 - aminoguanidines, the 1,1-di(lower) alkyl - 3 - aminoguanidines and the 1,2-di(lower)alkyl-3-aminoguanidines can be prepared by the process described in J. Med. Chem. 6, 283 (1963); the 2-(2-imidazolin-2-yl)-hydrazine (a cyclic aminoguanidine) may be prepared by the process described in J. Org. Chem., 18, 790 (1953); the 1 - [di(lower)alkylamino(lower)alkyl]-3-aminoguanidines can be prepared by the process described in J. Med. Chem., 7, 493 (1964); and the 1-[hexamethyleneimino (lower)alkyl]-3-aminoguanidines, the 1-[heptamethyleneimino(lower)alkyl] - 3 - aminoguanidines and the 1-[octamethyleneimino(lower)alkyl]-3-aminoguanidines can be prepared by the process described in Bull. Soc. Chem. France, 561 (1962). In one manner of proceeding, 1.3 parts by weight of an aminoguanidine salt such as the nitrate, is mixed with 40 parts by volume of methanol and the mixture is heated to about 50° C. then adjusted to about pH 3 with a mineral acid. About 1.3 parts by weight of the nitrate ester of the gon-4-en-3-one (IIb) is added, then the mixture is maintained at about 0–5° C. for about 12 hours, during which time the condensation has become substantially complete. The product from Step (c) can be recovered in any conventional manner. Usually it will precipitate from the mixture under the above-outlined conditions. If it does not, the mixture is evaporated to dryness, leaving the product as a residue. If desired, it can be purified by recrystallization from a solvent, such as a lower alcohol, especially methanol. If a particular acid addition salt is desired, it can be obtained directly from Step (c) by using the corresponding acid salt of aminoguanidine. Alternatively one salt can be converted to another by entirely conventional techniques such as, for example, liberating the free base amidinohydrazone of Formula I from one salt by treatment with a strong base, such as sodium hydroxide, then conversion of the said free base into the other, desired, salt by methods to be exemplified in detail hereinafter.

The starting materials of Formula IIa and IIb are prepared from readily available steroid compounds by techniques known to those skilled in the art. For example, a 17,17-substituted alkylene dioxy compound of Formula III:

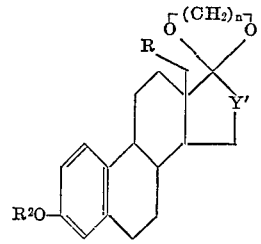

wherein n, R and Y' are as above defined and R² is lower alkyl, cycloalkyl, and the like, can be prepared from the corresponding 17-ketones and ethane-1,2-diol or propane-1,3-diol by treatment under conventional ketalizing conditions as disclosed by H. Smith in U.S. 3,138,588; the 17-ketal compound of Formula III then can be reduced to a 17-ether alcohol of Formula IV:

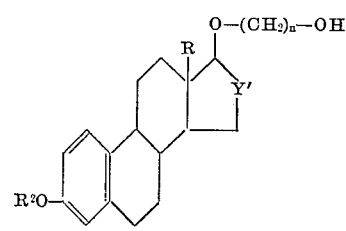

wherein n, R, R² and Y' are defined hereinabove, with a reducing agent such as lithium aluminum hydride-aluminum chloride, as described in the copending application of G. R. Wendt and K. W. Ledig, U.S. Ser. No. 310,485, filed on Sept. 20, 1963; now U.S. 3,366,654. The 17-hydroxyalkoxy compound of Formula IV then can be selectively reduced with a reagent, such as lithium and 1-methoxy-2- propanol, in a suitable solvent such as liquid ammonia to provide an enol ether of Formula V:

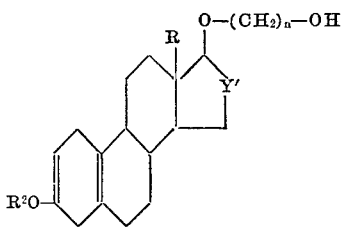

wherein $n$, R, $R^2$ and Y' are as hereinabove defined, which can be directly acid hydrolyzed by treatment in methanol, concentrated hydrochloric acid and water, as is exemplified in the copending application of G. R. Wendt and K. W. Ledig, U.S. Ser. No. 310,465, filed Sept. 20, 1963, now U.S. 3,366,652 into the gon-4-ene-3-one compounds of Formula IIb, wherein $R^1$ is hydrogen.

Compounds of Formula IIb are treated with lithium in ammonia, or an obvious chemical equivalent thereof, as will be exemplified in detail hereinafter to provide 5α-estran-3-ones of Formula VI

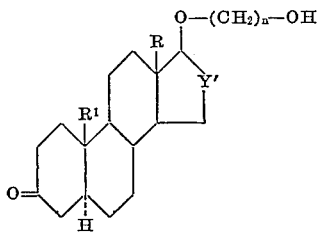

wherein $n$, R, $R^1$ and Y' are as hereinabove defined, which, in turn, are treated with lithium aluminum tri-tert.-butoxy hydride, or an obvious chemical equivalent thereof, as will be exemplified hereinafter, to provide compounds of Formula IIa.

Starting materials of Formula IIb wherein $R^1$ is methyl or ethyl are prepared by ketalizing the corresponding 3-ol, 17-one, as shown above, the oxidizing the 3-ol to a 3-one, by entirely conventional techniques.

As is mentioned hereinabove, the new nitrate esters of 17β-(hydroxyalkoxy) steroid 3-ols, 3-ones and amidinohydrazones and their salts of Formula I are pharmacologically active, especially as cardiovascular agents. This makes them useful in the treatment of conditions in the living organism responsive to treatment with active cardiovascular agents, such as coronary insufficiency and angina pectoris. Furthermore, the instant compounds are of particular value for such purposes because they are well tolerated, exhibit excellent response, have a rapid onset of action, long lasting effect and low toxicity.

The compounds of this invention can be administered alone or in combination with pharmaceutically acceptable carriers, the proportion of which is determined by the solubility and chemical nature of the compound, selected route of administration and standard pharmaceutical practice. For example, they may be administered orally in the form of tablets or capsules containing such excipients as starch, milk sugar, certain types of clay, and the like. They may be administered sublingually in the form of troches or lozenges in which the active ingredient is mixed with sugar and corn syrups, flavoring agents and dyes; and then dehydrated sufficiently to make the mixture suitable for pressing into solid, compact form. They may be administered orally in the form of suspensions which may contain coloring and flavoring agents or they may be injected parenterally, that is intramuscularly, intravenously or subcutaneously. For parenteral administration they may be used in the form of a sterile suspension containing other solutes, for example, enough saline or glucose to make the solution isotonic.

The dosage of the present therapeutic agents will vary with the form of administration and the particular compound selected. Furthermore, it will vary with the particular subject under treatment. Generally, treatment is initiated with small dosages, substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects. When used as cardiovascular agents, particularly vasodilators, they can be administered in general at a level that is in the range of from about 0.1 mg./kg. to about 10 mg./kg. per day, although as mentioned, variations will occur.

Of course, as will be understood by those skilled in the art, the compounds of this invention can exist in optically active forms, designated d- (for the natural series) and l- (for the unnatural series) and as racemic mixtures thereof, designated, d,l. If a racemic starting material (made by any one of several total syntheses) is used, the instant products will be d,l. If a natural configuration starting material is used, the product will have the d-configuration. The l-compounds can be obtained by resolving racemic d,l mixtures.

DESCRIPTION OF THE PREFERRED EMBODIMENTS

The following examples are given by way of illustration and are not to be construed as limitations of this invention, many variations of which are possible without departing from the scope and spirit thereof.

EXAMPLE 1 d-17β-(2-hydroxyethoxy)-5α-estran-3β-ol, dinitrate (a) d-17β-(2-hydroxyethoxy)-5α-estran-3-one.—A solution of 6.5 g. of d-17β(2-hydroxyethoxy)ester-4-en-3-one, (prepared by the procedure of Example 4 of U.S. patent application Ser. No. 310,465, filed Sept. 20, 1963, now U.S. Patent 3,366,652) 65 ml. of ether and 65 ml. of dioxane is added dropwise during 20 minutes to a solution of 650 ml. of ammonia (freshly distilled) and 650 mg. of lithium. After stirring an additional 20 min., the reaction mixture is treated with 40 g. of ammonium chloride, then with water. The organic material is extracted with chloroform. Chromatographic separation over neutral alumina (grade III) in chloroform and elution with benzene affords 3.0 g. of product, which is recrystallized from acetone-hexane, M.P. 137–138° C.

Analysis.—Calcd. for $C_{20}H_{32}O_3$: C, 74.96; H, 10.06. Found: C, 75.29; H, 10.09.

(b) d-17β-(2-hydroxyethoxy)-5α-estran-3β-ol.—A solution of the product of Step (a), 1.8 g., in 100 ml. of tetrahydrofuran is cooled in an ice bath and treated with 4.5 g. of lithium aluminum tri-tertiary butoxy hydride under nitrogen. After standing overnight, the reaction mixture is acidified with 2 N hydrochloric acid and the material extracted with chloroform. Evaporation to dryness and recrystallization of the residue from acetone-hexane affords 1.3 g. of the title compound, M.P. 152–153° C.

Analysis.—Calcd. for $C_{20}H_{34}O_3$: C, 74.49; H, 10.63. Found: C, 74.62; H, 10.37.

(c) d-17β-(2 - hydroxyethoxy) - 5α-estran-3β-ol, dinitrate.—To a solution of 4.7 ml. of acetic anhydride and 1.6 ml. of 90% fuming nitric acid at −40° C. is added 700 mg. of the product of Step (b). The reaction mixture is brought to 0° C. during 5 min., then poured over ice water and neutralized with sodium bicarbonate. The material is extracted with ether and the ether is concentrated to 2 ml. to give, after adding hexane and filtering off and drying the precipitate, 400 mg. of the title compound, M.P., 85–86° C.

EXAMPLE 2

*Analysis.*—Calcd. for $C_{20}H_{32}N_2O_7$: C, 58.23; H, 7.82; N, 6.79. Found: C, 57.95; H, 7.55; N, 6.83.

The nitration procedure of Example 1, Step (c), is repeated, substituting for the $d$-17$\beta$-(2-hydroxyethoxy)-5$\alpha$-estran-3$\beta$-ol, stoichiometrically-equivalent amounts of the following substituted steroidal 3$\beta$-ols:

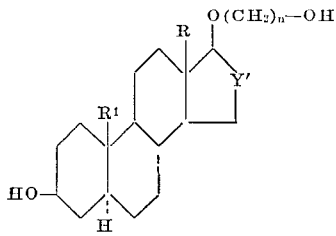

| n | R | R¹ | Y' |
|---|---|----|----|
| 3 | CH₃ | H | CH₂ |
| 2 | CH₃ | H | CH₂ |
| 2 | CH₃ | CH₃ | CH₂ |
| 2 | CH₃ | CH₂CH₃ | CH₂ |
| 2 | CH₂CH₃ | H | CH₂ |
| 2 | CH₂CH₂CH₃ | H | CH₂ |
| 2 | CH₂(CH₂)₄CH₃ | H | CH₂ |
| 2 | CH₃ | H | C($\alpha$-H)($\beta$-CH₃) |
| 2 | CH₃ | H | C($\beta$-H)($\alpha$-OH) |

There are obtained the correspondingly substituted nitrate esters of 17$\beta$-(hydroxyalkoxy)steroid 3-ols of the formula:

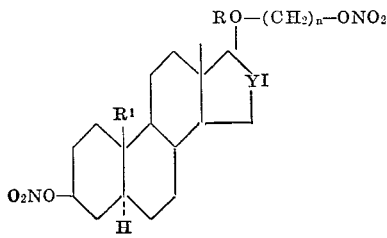

| n | R | R¹ | Y |
|---|---|----|----|
| 3 | CH₃ | H | CH₂ |
| 2 | CH₃ | H | CH₂ |
| 2 | CH₃ | CH₃ | CH₂ |
| 2 | CH₃ | CH₂CH₃ | CH₂ |
| 2 | CH₂CH₃ | H | CH₂ |
| 2 | CH₂CH₂CH₃ | H | CH₂ |
| 2 | CH₂(CH₂)₄CH₃ | H | CH₂ |
| 2 | CH₃ | H | C($\alpha$-H)($\beta$-CH₃) |
| 2 | CH₃ | H | C($\beta$-H)($\alpha$-ONO₂) |

EXAMPLE 3

$d$-17$\beta$-(2-hydroxyethoxy)-estr-4-en-3-one, nitrate

To a solution of 9.4 ml. of acetic anhydride and 3.1 ml. of 90% fuming nitric acid at —40° C., there is added 1.3 g. of $d$-17$\beta$-(2-hydroxyethoxy) estr-4-en-3-one. The reaction mixture is warmed to +2° C. and then poured over ice-water. The mixture is neutralized with sodium bicarbonate and the organic material extracted into ether. The ether layer is washed with brine, dried over magnesium sulfate and evaporated to leave product as a residue. Infrared absorption peak $$\lambda_{max.}^{film}\ 6.10$$

indicative of the —ONO₂ group.

EXAMPLE 4

The nitration procedure of Example 3 is repeated, substituting for the $d$-17$\beta$-(2-hydroxyethoxy)estr-4-en-3-one, stoichiometrically-equivalent amounts of the following substituted steroidal 3-ones:

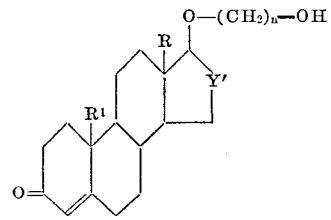

| n | R | R¹ | Y' |
|---|---|----|----|
| 3 | CH₃ | H | CH₂ |
| 2 | CH₃ | H | CH₂ |
| 2 | CH₃ | CH₃ | CH₂ |
| 2 | CH₃ | CH₂CH₃ | CH₂ |
| 2 | CH₂CH₃ | H | CH₂ |
| 2 | CH₂CH₂CH₃ | H | CH₂ |
| 2 | CH₂(CH₂)₄CH₃ | H | CH₂ |
| 2 | CH₃ | H | C($\alpha$-H)($\beta$-CH₃) |
| 2 | CH₃ | H | C($\beta$-H)($\alpha$-OH) |

There are obtained the correspondingly substituted nitrate esters of 17$\beta$-(hydroxyalkoxy)steroid 3-ones of the formula:

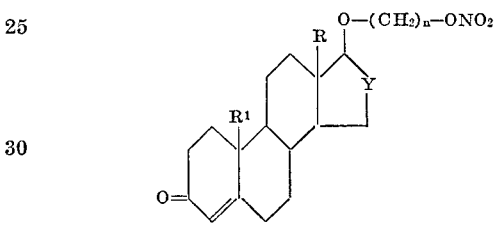

| n | R | R¹ | Y |
|---|---|----|----|
| 3 | CH₃ | H | CH₂ |
| 2 | CH₃ | H | CH₂ |
| 2 | CH₃ | CH₃ | CH₂ |
| 2 | CH₃ | CH₂CH₃ | CH₂ |
| 2 | CH₂CH₃ | H | CH₂ |
| 2 | CH₂CH₂CH₃ | H | CH₂ |
| 2 | CH₂(CH₂)₄CH₃ | H | CH₂ |
| 2 | CH₃ | H | C($\alpha$-H)($\beta$-CH₃) |
| 2 | CH₃ | H | C($\beta$-H)($\alpha$-ONO₂) |

EXAMPLE 5

$d$-17$\beta$-(2-hydroxyethoxy)estr-4-en-3-one, amidinohydrazone, nitrate ester and nitric acid addition salt To a hot solution (50° C.) of 1.3 g. of aminoguanidine nitrate in 40 ml. of methanol is added enough 7% HNO₃ to make the pH 3, and then 1.3 g. of $d$-17$\beta$-(2-hydroxyethoxy)estr-4-en-3-one, nitrate. The mixture is maintained at 0–5° C. for about 12 hours. The precipitate is filtered off and recrystallized from methanol to give the title compound, M.P. 218° C., dec.

*Analysis.*—Calcd. for $C_{21}H_{33}N_5O_4$: C, 52.27; H, 7.10; N, 17.42. Found: C, 52.27; H, 7.21; N, 17.67.

The nitric acid addition salt is converted to the free base by suspending it in water, adding an excess of sodium hydroxide solution, extracting the liberated base with ether and evaporating the ether to leave the free base as a residue.

The free base is converted to the corresponding acid addition salts by treating a solution of the base in acetone with stoichiometrically-equivalent amounts of the respective acid in ethanol, then freeze-drying the mixture to leave the acid addition salt as a residue. In this manner, there are obtained the fumarate, malate, citrate, tartrate, embonate, acetate, hydrochloride, and sulfate.

EXAMPLE 6

The condensation procedure of Example 5 is repeated, substituting for $d$-17$\beta$-(2-hydroxyethoxy)estr-4-en-3-one, nitrate ester, stoichiometrically-equivalent amounts of the nitrate esters of 17$\beta$-(hydroxyalkoxy) steroid 3-ones of Example 4. There are obtained the correspondingly substituted nitric acid addition salts of 17$\beta$-(hydroxyalkoxy)

steroidal 3-one, amidinohydrazone, nitrates, of the formula:

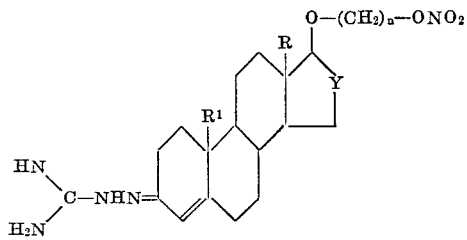

| n | R | R¹ | Y |
|---|---|---|---|
| 3 | CH₃ | H | CH₂ |
| 2 | CH₃ | H | CH₂ |
| 2 | CH₃ | CH₃ | CH₂ |
| 2 | CH₃ | CH₂CH₃ | CH₂ |
| 2 | CH₂CH₃ | H | CH₂ |
| 2 | CH₂CH₂CH₃ | H | CH₂ |
| 2 | CH₂(CH₂)₄CH₃ | H | CH₂ |
| 2 | CH₃ | H | C(α-H)(β-CH₃) |
| 2 | CH₃ | H | C(β-H)(α-ONO₂) |

These are converted to the free bases by treatment with sodium hydroxide according to the procedure of Example 5.

The free bases are converted, by the procedure of Example 5 to the corresponding fumarate, malate, citrate, tartrate, embonate, acetate, hydrochloride and sulfate acid addition salts.

EXAMPLE 7

17β - (2-hydroxyethoxy)estr-4-en-3-one, 2-(2-imidazolin-2-yl)hydrazone, nitrate ester, hydrochloric acid addition salt To a hot solution of 1.0 g. of 2-(2-imidazolin-2-yl)-hydrazine hydrochloride in 20 ml. of methanol, there is added 1.0 g. of 17β-(2-hydroxyethoxy)estr-4-en-3-one, nitrate. After addition of 20 drops of 5.4 N isopropanolic hydrochloric acid, the reaction mixture is stirred for four hours and then chilled to about 5° C. for 48 hours. The precipitated product is collected by filtration and dried.

EXAMPLE 8

17β-(2-hydroxyethoxy)estr-4-en-3-one, N - ethylamidino-hydrazone, nitrate ester, nitric acid addition salt To a hot solution of 2.0 g. of 1-ethyl-3-aminoguanidine in 70 ml. of methanol is added 2.0 g. of 17β-(2-hydroxy-ethoxy)-estr-4-en-3-one, nitrate, and the reaction mixture is adjusted to pH 2 with 7% nitric acid and stirred for two hours. The next day, the precipitated product is collected by filtration and dried.

EXAMPLE 9

The procedure of Example 8 is repeated, substituting for the 1-ethylaminoguanidine, stoichiometrically-equivalent amounts of the following aminoguanidines:

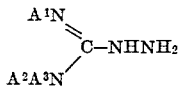

| A¹ | A² | A³ |
|---|---|---|
| CH₃ | CH₃ | CH₃CH₂ |
| H | CH₃ | CH₃ |
| H | CH₃CH₂CH₂ | CH₃CH₂CH₂ |
| H | H | CH₃CH₂ |
| CH₃ | CH₃CH₂ | CH₃CH₂ |
| H | CH₃CH₂CH₂ | CH₃ |
| H | CH₃CH₂ | CH₃CH₂ |
| H | H | NO₂ |
| H | H | (CH₃)₂NCH₂CH₂ |
| H | H | (CH₃CH₂)₂NCH₂CH₂CH₂ |
| H | H | (CH₃CH₂CH₂)₂NCH₂CH₂ |
| H | H | (CH₃CH₂CH₂CH₂)(CH₃)NCH₂CH₂ |
| H | H | (CH₂)₆NCH₂CH₂ |
| H | CH₃CH₂ | (CH₂)₇NCH₂CH₂ |
| H | H | (CH₂)₈NCH₂CH₂ |
| CH₃ | CH₃ | CH₃ | in the form of their nitric acid addition salts. There are obtained the correspondingly substituted nitric acid addition salts of 17β - (hydroxyethoxy)estr - 4 - en - 3 - one, amidino-hydrazone, nitrates, of the formula:

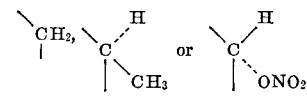

| A¹ | A² | A³ |
|---|---|---|
| H | CH₃ | CH₃ |
| H | CH₃CH₂CH₂ | CH₃CH₂CH₂ |
| H | H | CH₃CH₂ |
| CH₃ | CH₃CH₂ | CH₃CH₂ |
| H | CH₃CH₂CH₂ | CH₃ |
| H | CH₃CH₂ | CH₃CH₂ |
| H | H | NO₂ |
| H | H | (CH₃)₂NCH₂CH₂ |
| H | H | (CH₃CH₂)₂NCH₂CH₂CH₂ |
| H | H | (CH₃CH₂CH₂)₂NCH₂CH₂ |
| H | H | (CH₃CH₂CH₂CH₂)(CH₃)NCH₂CH₂ |
| H | H | (CH₂)₆NCH₂CH₂ |
| H | CH₃CH₂ | (CH₂)₇NCH₂CH₂ |
| H | H | (CH₂)₈NCH₂CH₂ |
| CH₃ | CH₃ | CH₃ |

EXAMPLE 10

The condensation procedure of Example 8 is repeated, substituting for the 1-ethylaminoguamidine, stoichiometrically-equivalent amounts of the substituted aminoguanidines of Example 9, and for the 17β-(2-hydroxyethoxy) estr - 4 - en-3-one, nitrate, stoichiometrically-equivalent amounts of the nitrate esters of 17β-(hydroxyalkoxy) steroid 3-ones of Example 4. The correspondingly-substituted nitric acid addition salts of 17β-(hydroxyalkoxy) steroid 3-one, amidinohydrazone, nitrates, of this invention, are obtained.

These are converted to the free bases by treatment with sodium hydroxide according to the procedure of Example 5.

The free bases are converted, by the procedure of Example 5 to the corresponding fumarate, malate, citrate, tartrate, embonate, acetate, hydrochloride and sulfate acid addition salts.

What is claimed is:
1. A compound selected from the group consisting of those of the formula:

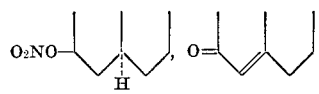

wherein:
n is 2 or 3;
R is lower alkyl;
R¹ is hydrogen, methyl or ethyl;
Y is

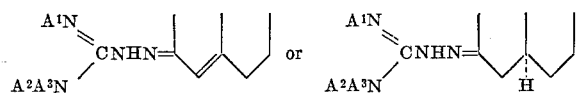

and X is wherein $A^1$ and $A^2$, independently, are hydrogen or (lower)alkyl or, taken together, are —$CH_2CH_2$—; and $A^3$ is hydrogen, nitro, (lower)alkyl, di(lower)alkylamino (lower)alkyl, hexamethyleneimino(lower)alkyl, heptamethyleneimino(lower)alkyl or octamethyleneimino (lower(alkyl), provided however that when $A^1$ and $A^2$ taken together are —$CH_2CH_2$—, $A^3$ is hydrogen; and pharmaceutically-acceptable acid addition salts of said compounds wherein X is basically-substituted with the amidinohydrazone group.

2. A compound as defined in claim 1 which is $d$-17$\beta$-(2-hydroxyethoxy)-5$\alpha$-estran-3$\beta$-ol, dinitrate.

3. A compound as defined in claim 1 which is $d$-17$\beta$-(2-hydroxyethoxy)estr-4-en-3-one, nitrate.

4. A compound as defined in claim 1 which is $d$-17$\beta$-(2-hydroxyethoxy)estr-4-en-3-one, amidinohydrazone, nitrate ester, in the form of an acid addition salt with nitric acid.

References Cited
UNITED STATES PATENTS

| 3,138,620 | 6/1964 | Tadanier | 260—397.3 |
| 3,193,563 | 7/1965 | Cross | 260—397 |

HENRY A. FRENCH, Primary Examiner

U.S. Cl. X.R.

260—239.5, 239.55, 397.5, 999

PO-1050
(5/69)

UNITED STATES PATENT OFFICE
CERTIFICATE OF CORRECTION

Patent No. 3,494,941    Dated February 10, 1970

Inventor(s) Kurt W. Ledig and Gerhard R. Wendt

It is certified that error appears in the above-identified patent and that said Letters Patent are hereby corrected as shown below:

In column 4, lines 36-48, formula

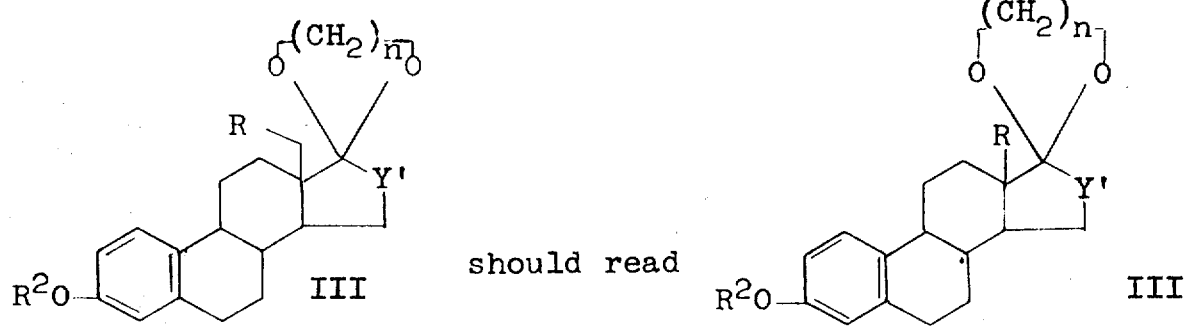

In column 7, lines 35-45, formula

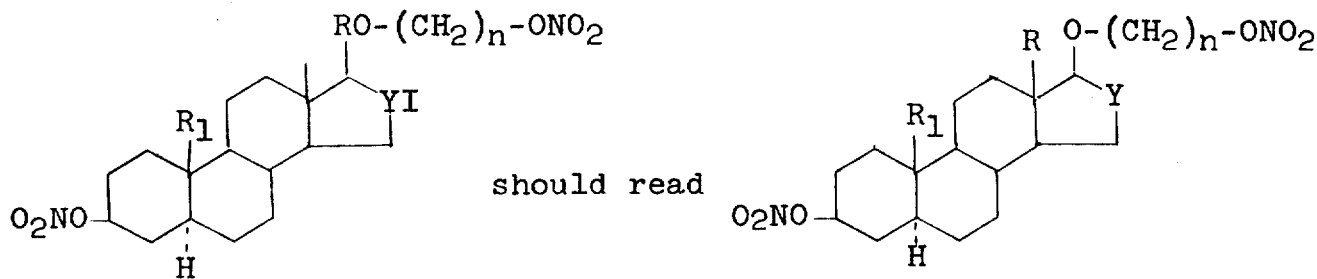

In column 9, lines 4-12, formula

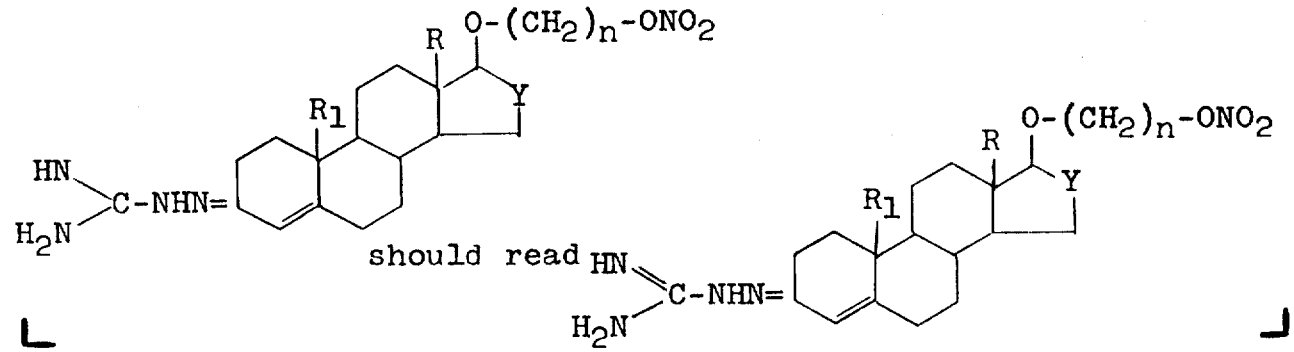

Signed and sealed this 21st day of July 1970.

(SEAL)
Attest:

Edward M. Fletcher, Jr.
Attesting Officer

WILLIAM E. SCHUYLER, JR.
Commissioner of Patents